US010527835B2

(12) United States Patent
Kremer et al.

(10) Patent No.: US 10,527,835 B2
(45) Date of Patent: Jan. 7, 2020

(54) DEVICE AND METHOD FOR DETECTING LIGHT USING A SILICON PHOTOMULTIPLIER AND FLAT-TOP OPTICAL SYSTEM

(71) Applicant: Leica Microsystems CMS GmbH, Wetzlar (DE)

(72) Inventors: Manuel Kremer, Leimen (DE); Marcus Dyba, Heidelberg (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 132 days.

(21) Appl. No.: 15/551,914

(22) PCT Filed: Feb. 24, 2016

(86) PCT No.: PCT/EP2016/053831
§ 371 (c)(1),
(2) Date: Aug. 18, 2017

(87) PCT Pub. No.: WO2016/135177
PCT Pub. Date: Sep. 1, 2016

(65) Prior Publication Data
US 2018/0039053 A1  Feb. 8, 2018

(30) Foreign Application Priority Data
Feb. 24, 2015  (LU) ........................................ 92664

(51) Int. Cl.
*G02B 21/00*  (2006.01)
*G01J 1/44*  (2006.01)

(52) U.S. Cl.
CPC .............. *G02B 21/008* (2013.01); *G01J 1/44* (2013.01); *G02B 21/0096* (2013.01); *G01J 2001/4466* (2013.01)

(58) Field of Classification Search
CPC ..... G02B 21/008; G02B 21/0096; G01J 1/44; G01J 2001/4466
(Continued)

(56) References Cited

U.S. PATENT DOCUMENTS

| 6,295,168 | B1 | 9/2001 | Hoffnagle et al. |
| 8,023,206 | B2 * | 9/2011 | Laskin ............... G02B 27/0927 359/399 |

(Continued)

FOREIGN PATENT DOCUMENTS

| CN | 202342011 U | 7/2012 |
| EP | 1617257 A1 | 1/2006 |
| EP | 2546621 A1 | 1/2013 |

OTHER PUBLICATIONS

Hamamatsu: Photon is our Business, "Technical Information: MPPC, MPPC modules", Hamamatsu Photonics K.K, Solid State Division, pp. 1-39, Dec. 2013.

(Continued)

*Primary Examiner* — Seung C Sohn
(74) *Attorney, Agent, or Firm* — Leydig, Voit & Mayer, Ltd.

(57) ABSTRACT

A device for detecting light includes a silicon photomultiplier (SiPM) comprising a detection area formed from an array of a plurality of single-photon avalanche diodes (SPADs). An optical system is configured to shape the light such that the detection area is covered as completely as possible with a light beam region of substantially constant intensity.

14 Claims, 17 Drawing Sheets

(58) Field of Classification Search
USPC .......................................................... 250/207
See application file for complete search history.

(56) References Cited

U.S. PATENT DOCUMENTS

| | | | |
|---|---|---|---|
| 8,401,621 B2* | 3/2013 | Buono | .................... G01T 1/161 |
| | | | 600/431 |
| 9,507,090 B2* | 11/2016 | Sanghera | ................ G02B 6/262 |
| 10,192,916 B2* | 1/2019 | Huang | .............. H01L 27/14627 |
| 2006/0012863 A1 | 1/2006 | Goelles et al. | |
| 2011/0095192 A1 | 4/2011 | Johnson | |
| 2013/0015331 A1 | 1/2013 | Birk et al. | |

OTHER PUBLICATIONS

Oliver Homburg, et al., "Efficient beam shaping for high-power laser applications", Microoptics, vol. 1, pp. 44-47, Jan. 2007.
Fabian Duerr, et al., "Refractive laser beam shaping by means of a functional differential equation based design approach", Optics Express 8001, vol. 22, No. 7, Mar. 28, 2014.
Stefan Rung, et al., "Laser Thin Film Ablation with Multiple Beams and Tailored Beam Profiles", Proc. Of SPIE vol. 8967, pp. 89670P-1-89670P-13, Dec. 2014.

* cited by examiner

DEVICE AND METHOD FOR DETECTING LIGHT USING A SILICON PHOTOMULTIPLIER AND FLAT-TOP OPTICAL SYSTEM

CROSS-REFERENCE TO PRIOR APPLICATIONS

This application is a U.S. National Stage Application under 35 U.S.C. § 371 of International Application No. PCT/EP2016/053831 filed on Feb. 24, 2016, and claims benefit to Luxembourg Patent Application No. LU 92664 filed on Feb. 24, 2015. The International Application was published in German on Sep. 1, 2016 as WO 2016/135177 A1 under PCT Article 21(2).

FIELD

The invention relates to a device for detecting light, in particular for use in a microscope. The invention further relates to a corresponding microscope, in particular a scanning microscope, preferably a laser scanning microscope. Furthermore, the invention relates to a corresponding method, preferably making use of the device.

Within the meaning of the invention, light represents any electromagnetic radiation which can be detected by a silicon photomultiplier (SiPM) or a single-photon avalanche diode (SPAD), in particular visible light, infrared light, UV light, X-ray radiation and gamma radiation. The expression "light intensity" in the context of this application is therefore a synonym for the expression "radiation intensity". By way of non-restrictive example, the invention can be used in a laser scanning microscope.

BACKGROUND

Devices for detecting light have been known in practice for many years and are used, for example, in laser scanning microscopes. In this case, corresponding devices which pick up the detection signal from the sample to be examined under a microscope are of central importance for image quality. This applies above all to comparatively weak detection signals such as are typical in (confocal) fluorescence microscopy, SHG microscopy or Raman microscopy.

For light detectors, two characteristic variables are of particular significance: the detector noise and the quantum yield, i.e. the detection efficiency. The quantum yield describes the proportion of the light incident on the detector that actually generates a useable electrical signal. The noise denotes the background electronic signal, which is overlaid in an interfering manner on the actual detection signal. The ratio of these two variables, what is known as the signal-to-noise ratio (SNR), is one of the central characteristic variables of a light detector.

In practice, for many years photomultipliers (PMT) have been the dominant light detectors in laser scanning microscopy. In comparison with semiconductor-based detectors—e.g. photodiodes—PMTs have a lower quantum yield. Due to their low noise, however, they offer a very good SNR. Furthermore, improved variants comprising a GaAsP (gallium arsenide phosphide) layer as a light-sensitive medium have been available in recent years.

Furthermore, it has been known for some years to use alternative semiconductor detectors in fluorescence microscopy. In this case, above all single-photon avalanche diodes (SPADs) play a major role. The SPADs operate in Geiger mode.

Here, a reverse bias which lies just above the breakdown voltage is applied to the SPADs. In this case, the breakdown voltage is a few hundred Volts.

In this mode, an absorbed photon generates an electron-hole pair in the semiconductor, which is accelerated by the strong electric field and carries out further collision ionizations. This process continues in an avalanche-like manner and triggers a measurable charge avalanche that is amplified by a factor of several millions. Thus, individual, absorbed photons can be measured, so that these detectors can be used for the measurement of extremely low light quantities, as are typical in fluorescence microscopy, for example.

A single photon leads to an electric discharge that is measured in the form of a short voltage pulse. In this case, there are two fundamental measuring modes. In the digital measuring mode, the voltage pulses are counted, the rising voltage flank serving as a triggering counting signal. Alternatively, the charge can be integrated in the analogue measuring mode by means of a measuring resistance, and the grouped charge quantity of all the pulses used as the measurement signal. Typically, the integrated charge quantity of all pulses in a specified time interval (pixel exposure time) is then digitized by an analogue-digital converter for further digital processing.

Regardless of the selected measuring mode, in the SPADs it is problematic that saturation of the signal occurs. In concrete terms, with an increasing amount of light incident on the detector, the measurement signal no longer increases to the same extent. The desired linear relationship between the input and output signal therefore no longer exists. Saturation occurs as a result of the fact that, during an avalanche discharge of the SPADs, a further absorbed photon cannot trigger a simultaneous second avalanche. Thus, following the initiation of a pulse, a dead time of the SPADs occurs during which detection cannot take place. This dead time corresponds to the time that is required to replenish in the semiconductor the charge carriers depleted during the avalanche discharge. Large quantities of light in which a plurality of photons arrive during the dead time can therefore no longer be fully picked up and the detector shows a non-linear characteristic saturation curve.

Since the low dynamic range of the detectors resulting therefrom at a maximum count rate of some $10^6$ to $10^7$ photons per second represents a problem of these highly sensitive detectors, over recent years, SPAD arrays have been developed. These are available from Hamamatsu Photonics K.K. under the name MPPC (multi-pixel photon counting) detector, for example. In the literature, these detectors are also referred to as silicon photomultipliers (SiPM), inter alia. The function of corresponding detectors is described, for example, under https://www.hamamatsu.com/resources/pdf/ssd/mppc_techinfo_e.pdf.

The basic principle of an SPAD array consists in that a plurality of individual SPADs are connected together in parallel to form a field. If a photon is incident on a single SPAD, then due to its dead time it is no longer sensitive for a period of typically several nanoseconds. Other SPADs, on which a further photon is incident within this time or at the same time as said other photon, can, however, detect this and generate a measurable charge pulse. Consequently, a pulse sequence can occur at the detector output which has a higher count rate than with a single SPAD.

It is thus known from the prior art to divide the entire detection light amongst a plurality of SPADs connected in parallel. This has the advantage that individual SPADs have only a fraction of the detection light applied to them and thus saturation of these SPADs occurs at a later point. Furthermore, during the dead time of an individual SPAD, further reception-ready SPADs are available. The dynamic range of these detectors is therefore significantly increased, depending on the number of SPADs connected in parallel. Commercially available SPAD arrays have, for example, 20×20 or more SPADs.

However, the known SPAD arrays are problematic in that they exhibit saturation behavior. Saturation can arise if too many photons are incident on the same SPAD within the dead time. In this case, the saturation is similar to the saturation of an individual SPAD. Furthermore, saturation can also take place in the digital detection mode if the—rising—trigger flanks of a pulse during a previous pulse do not lead to the renewed triggering of the digital counter since their voltage level lies above the voltage threshold for counter triggering—what is known as the trigger level—and is therefore not detected by the counter unit as a pulse flank.

Both the effects mentioned also lead to a saturation of SPAD arrays. It is known in practice that, for example, above approximately $10^8$ incident photons per second, the output signal—the number of electric discharges—assumes an almost constant value, so that precise measurement of the light quantity is no longer possible. Provided the characteristic curve—specific for a particular detector design—is known, it can be linearized by computational correction. In the region of almost complete saturation, however—for example, somewhat above $10^{11}$ photons per second—a sufficiently precise computational correction is no longer possible. Since a characteristic curve in the analogue measuring mode shows an almost identical shape to that in the digital measuring mode, no further distinction will be made below between the different saturation causes.

Although the parallel connection of a plurality of SPADs to form an SPAD array represents an improvement in the saturation problem, this is however still present. Thus, the dynamic range of known SPAD arrays is still below the dynamic range of photomultipliers, which are therefore still used for the detection of small light quantities even though their detection efficiency is poorer than that of SPAD detectors.

SUMMARY

In an embodiment, the present invention provides a device for detecting light. At least one silicon photomultiplier (SiPM) comprises a detection area formed from an array of a plurality of single-photon avalanche diodes (SPADs). At least one optical system is configured to shape the light such that the detection area is substantially covered with a light beam region of substantially constant intensity.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
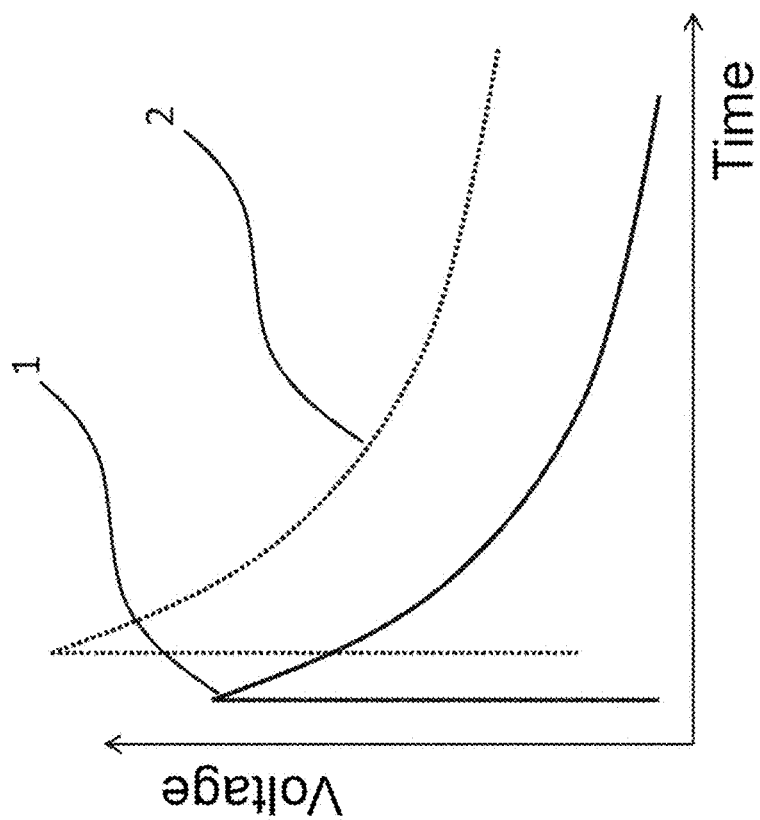
FIG. 1 shows the voltage signal measured by an SPAD as a function of time.

In an embodiment, the present invention provides a device for detecting light and a corresponding method, according to which at high sensitivity, an optimized signal-to-noise ratio and low manufacturing costs, the effective dynamic range and the detection efficiency can be increased and the characteristic curve can be linearized. According to another embodiment, a correspondingly equipped microscope is provided.

According to an embodiment of the invention, the device for detecting light, in particular for use in a microscope, is equipped with at least one silicon photomultiplier (SiPM) and one optical system. The SiPM comprises a detection area formed from an arrangement (array) of a plurality of single-photon avalanche diodes (SPADs). The optical system shapes the light such that the detection area is covered as completely as possible with a light beam region of almost constant intensity.

At this point, it should initially be noted that the expressions "light", "light beam", "detection light" and "detection light beam" are used synonymously.

It has been recognized according to an embodiment of the invention that the underlying object can be achieved in a surprisingly simple manner by means of ingeniously forming the light beam that is to be detected. The SPAD arrays known in the art have previously been utilized in (confocal) laser scanning microscopy in that the detection light is focused behind the confocal aperture onto the detector area using classical optical elements. The light emerging divergently behind the aperture is imaged onto the detector by means of lenses so that a Gaussian light distribution (more precisely, an Airy distribution) forms on the detector surface. According to an embodiment almost all the light is incident on the detection area and only a negligibly small amount of light falls beside the detection area. This is required in order to achieve high detection efficiency. With a Gaussian distribution of the detection light, as a consequence, a significantly lower light intensity is incident on the outer SPADs as compared with the SPADs lying in the central region of the detection area. For example, the outer SPADs are illuminated with less than 10% of the central intensity (the light intensity in the geometric center of the SPAD array). The closest, further inwardly arranged SPADs are illuminated with, for example, only approximately 31% of the central intensity. According to an embodiment of the invention, it has been found that the inner SPADs display a saturation effect significantly earlier than the outer SPADs. Thus the correspondingly illuminated detector produces a non-linear characteristic curve even at low overall light quantities.

It has now been found according to an embodiment of the invention that improved linearization of the characteristic curve over a greater dynamic range is possible if the detection light is spatially structured such that the individual SPADs of the detector are illuminated as homogeneously as possible, that is with as uniform a light intensity as possible.

According to an embodiment of the invention, the detection area is correspondingly illuminated by means of an optical system, by means of which the detection area can be illuminated with the most homogeneous light distribution possible. Thus, using simply designed means, premature saturation of the detector due to above-average light intensities of individual regions of the array is effectively prevented. This ideally leads to linear characteristic curve behavior over the greatest possible dynamic range.

In an advantageous manner, the optical system is formed as a flat-top optical system. This denotes an optical system which—in relation to a beam width—flattens a beam profile (for example, a Gaussian beam profile), that is, generates a region of relatively uniform light intensity or energy density. Such a beam profile is distinguished in that it remains radially constant or almost constant from the beam center over a large region and then rapidly falls off in an edge region with a steep flank. By this means, a light beam is formed that has a substantially constant illumination strength in the central region. Such a beam profile is known as a flat-top beam profile and the corresponding beam is referred to as a "top-hat beam". Corresponding optical elements for spatial laser beam shaping, which modify the beam profile of a laser beam, are already used in material processing. For example, beam shaping optical system ("beam shapers") are known, which transform a Gaussian laser beam profile into such a flat-top beam profile (that is, shape the beam into a "top-hat beam").

In this case, the flat-top optical system can be formed as a diffractive optical system, for example as a diffraction grating, or as a refractive optical system, for example comprising at least one aspherical lens and/or at least one free-form lens, or as a reflective optical system, for example as a non-spherical mirror. A corresponding refractive beam-forming optical system which converts an incident Gaussian light beam into a flat, almost angular, emerging light beam is described, for example, in F. Duerr, H. Thienpont, Optics Express, vol. 22, issue 7, pp. 8001-8011 (2014). Additionally, a corresponding optical system is described in U.S. Pat. No. 6,295,168.

In a more advantageous manner, the flat-top optical system can comprise a first lens and a second lens, wherein the first lens and the second lens can be formed as aspherical lenses or as free-form lenses, and wherein the first lens can distort a radial profile of the light and the second lens can collimate the light. Here, the at least one lens of the flat-top optical system can comprise an antireflection layer on a lens surface. In a particularly advantageous manner, said layer can be a spectrally broadband antireflection layer.

Additionally, the optical system can contain a pyramidal or polyhedral component, in particular a glass or polymer block, and a focusing lens. By means of a corresponding arrangement, a plurality of Gaussian light beam profiles laterally offset to one another are formed—in the case of a pyramidal component, for example, four Gaussian light beam profiles.

In a more advantageous manner, the flat-top optical system can contain a microlens array which shapes the beam in a desired manner. The use of a microlens array for shaping a flat-top beam profile is known in the art for other technical fields; see, for example, O. Homburg, D. Hauschild, F. Kubacki, V. Lissotschenko, Laser Technik Journal, vol. 4, issue 1, pp. 44-47, 2007. For such a microlens array, it is conceivable that all or some of the microlenses have an antireflection layer. In a particularly advantageous manner, this can be a spectrally broadband antireflection layer.

In a particularly advantageous manner, the optical system can shape the light such that the region of almost constant intensity has an at least almost round, rectangular, in particular almost square, shape. Depending on the geometry of the detector area, the optical system can be adapted such that the most homogenous illumination possible of the detector area is ensured. Corresponding flat-top optical systems which shape the light into a virtually square shape are manufactured, for example, by TOPAG Lasertechnik GmbH (Darmstadt) and are described by Stefan Rung et al. in Proceedings SPIE Photonics West 2014, LASE, LAMON XIX, "Laser Thin Film Ablation with Multiple Beams and Tailored Beam Profiles", paper 8967-24.

In a particularly advantageous manner, the SPADs can be designed and/or arranged such that the detection area has a round or at least nearly round shape or a rectangular, in particular square, shape.

Furthermore, the silicon photomultiplier can be formed as a line detector. Here, the line detector can comprise at least two individual arrays consisting of a plurality of SPADs each having at least two signal outputs. In one embodiment of the silicon photomultiplier as a line detector, in a particularly advantageous manner, a dispersive element, for example a prism, and/or a cylindrical lens, can be arranged between the optical system and the line detector. By means of this arrangement, the light to be detected is shaped into a flat line profile which has relatively sharp edges and a homogeneous intensity distribution in the inner region of the line profile.

The use of the device according to an embodiment of the invention in a microscope, in particular a scanning microscope, preferably a laser scanning microscope, is particularly advantageous. This can be a microscope for fluorescence microscopy and/or for Raman microscopy. Alternatively or additionally, it is conceivable for this microscope to be a microscope for second harmonic generation (SHG) microscopy.

With regard to the features of the method according to the invention, for the avoidance of repetition, reference is to be made to the embodiments of the device according to the invention, from which the features relating to the method are also revealed. Here too it is essential, according to an embodiment, that the optical system shapes the light such that the detection area is covered as completely as possible with a light beam region of almost constant intensity.

FIG. 1 shows the voltage signal measured by an SPAD as a function of time. From FIG. 1, saturation of the measurement signal of an SPAD known in the art can be seen. A single-photon leads to an electric discharge that is measured in the form of a short voltage pulse 1. During an avalanche discharge of the SPAD, a further, absorbed photon cannot trigger a simultaneous second avalanche, as indicated by the voltage pulse 2 shown as a dotted line. There is therefore a period of dead time following pulse initiation, during which period the SPAD cannot detect any more light.

Figure 2:
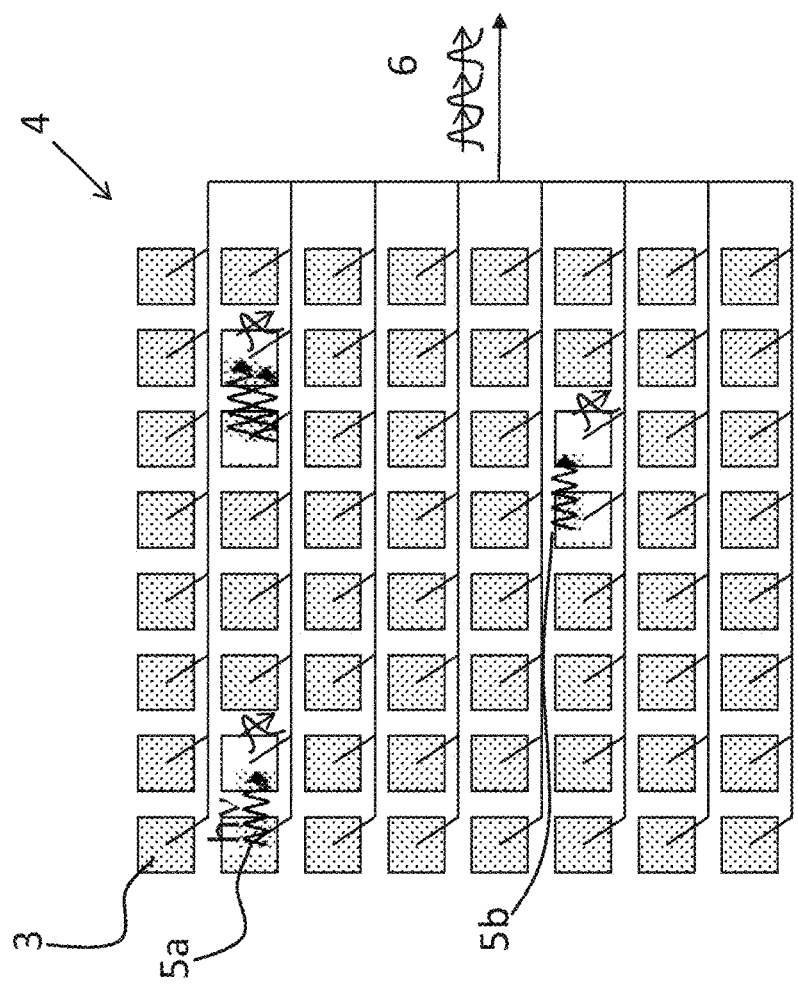
FIG. 2 is a schematic view of the fundamental structure of an array formed from a plurality of SPADs.

FIG. 2 is a schematic view of the fundamental structure of an array 4 formed from a plurality of SPADs 3. For better representation, in FIG. 2 and the subsequent figures, only one SPAD 3 is provided with a reference sign. In this case, a plurality of individual SPADs 3 are connected in parallel to form an array 4. If a photon 5$a$ is incident on a single SPAD 3, then due to its dead time it is no longer sensitive for several nanoseconds. Other SPADs 3, on which a further photon 5$b$ is incident within this time or at the same time as said other photon, can however detect the photon 5$b$ and generate a measurable charge pulse. A pulse sequence 6 can thus form at the detector output, which has a higher count rate than for an individual SPAD 3.

Figure 3:
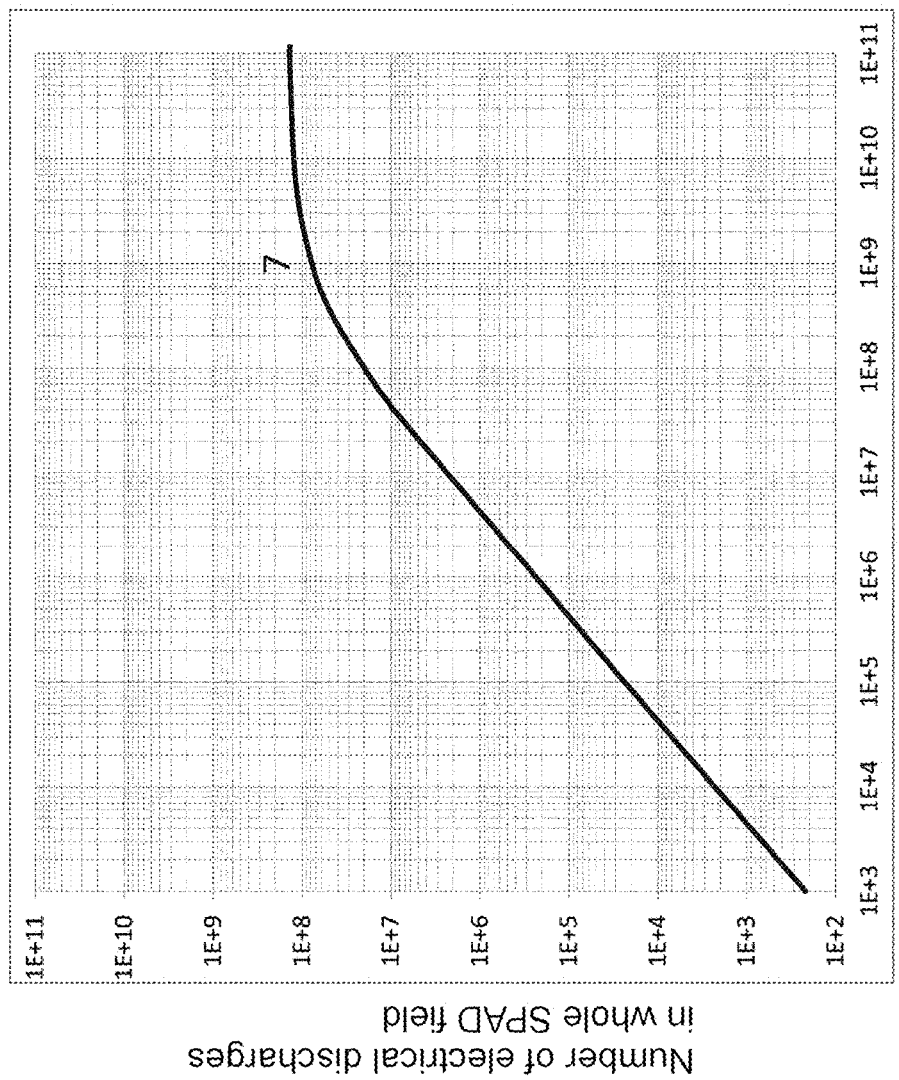
FIG. 3 is a characteristic curve of an array known in the art and operated in the digital measuring mode.

FIG. 3 shows a characteristic curve 7 of an array 4 known in the art, operated in the digital measuring mode. In this case, in concrete terms, the number of electrical discharges in the whole SPAD field (array) is plotted against the number of photons incident on the entire SPAD field per second with a double logarithmic scale. Above approximately $10^8$ incident photons per second, the curve becomes non-linear due to the saturation behavior. Above approximately $10^{11}$ incident photons per second, the output signal (the number of electric discharges) becomes virtually constant, so that a precise measurement of the light quantity is no longer possible. Provided that the characteristic curve 7, which is specific for a particular detector design, is known, it can be linearized by computational correction. In the region of almost complete saturation, that is, somewhat above $10^{11}$ photons per second, however, this is no longer possible with a sufficient degree of precision. Whilst in FIG. 3 a characteristic curve 7 is shown for the digital measuring mode, the same also applies for the analogue measuring mode.

Figure 4:
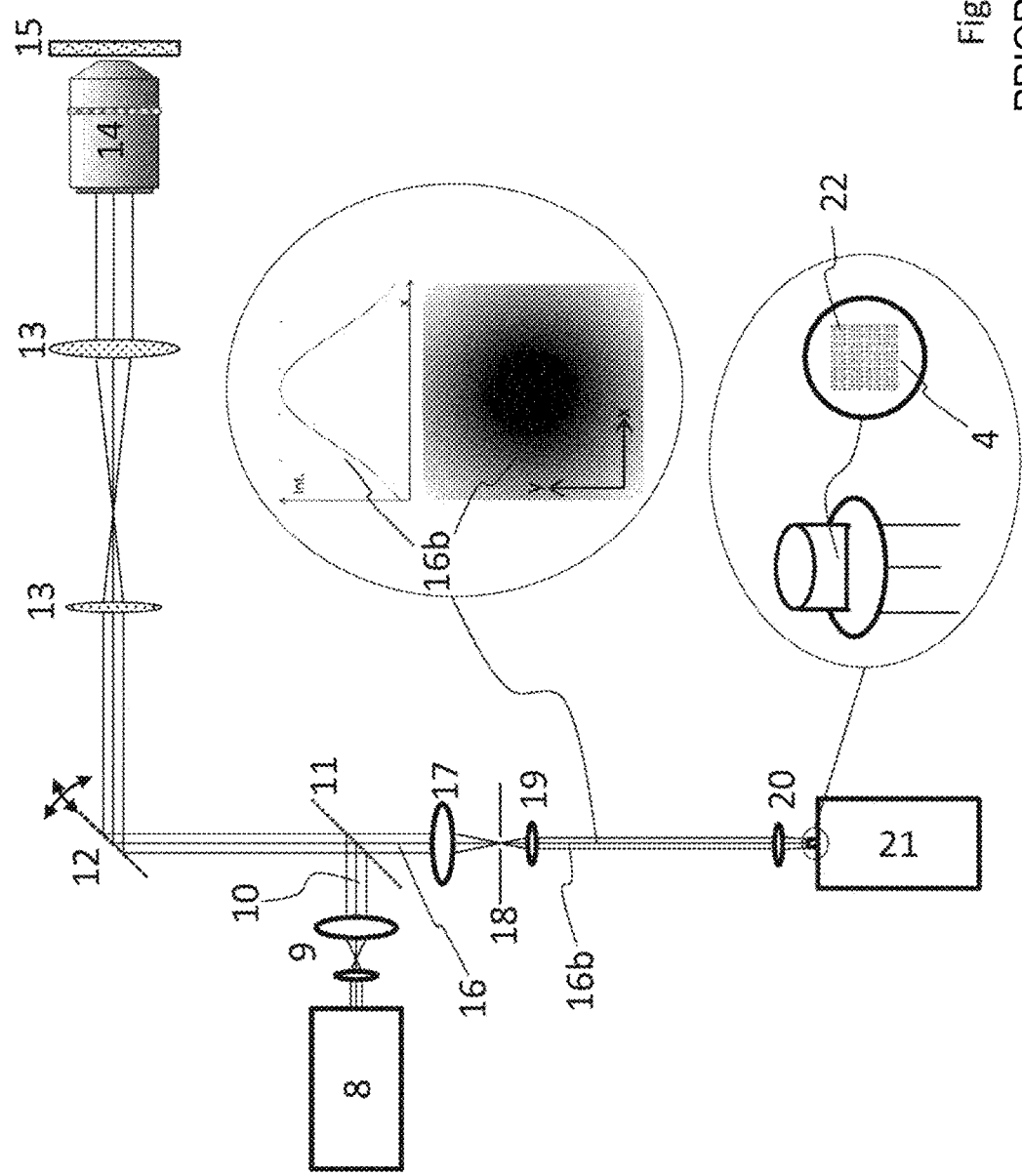
FIG. 4 is a schematic view of the fundamental structure of a laser scanning microscope in which a device according to the invention can be integrated.

FIG. 4 is a schematic view of the fundamental structure of a laser scanning microscope, in which a device according to the invention can be integrated. The confocal laser scanning microscope has an illumination light source 8, for example a laser, for emitting light. The light is shaped by an optical system 9 to form a parallelized illumination light beam 10 which is fed to the microscope via a color beam splitter 11. The illumination light beam 10 is deflected by means of a scanning unit 12 which can deflect the illumination light beam 10 for imaging scanning in two spatial directions (X, Y). This is typically achieved by means of tiltable mirrors which are formed by means of galvanometer scanners or, in a miniaturized form, by means of MEMS (microelectromechanical systems). Often, two or more rotatable mirrors are used as the scanning unit 12 in order to be able to scan the illumination light beam 10 in both spatial directions. For the sake of simplicity, only one mirror is shown here as the scanning unit 12.

The illumination light beam 10 is imaged into the objective 14 by means of the field optical systems 13. As field optical systems 13, a first scan lens and a second tube lens and possibly further lenses are usually used. The sample 15 is scanned two-dimensionally during the scanning movement of the scanning unit 12 and is illuminated in a time period, at a point at which the illumination light beam 10 is imaged in a diffraction-limited manner in each case. In the sample 15, at the current illumination point, fluorescence can be stimulated if the sample 15 has been marked with corresponding dyes. Alternatively, reflected light, scattered light, Raman scattering, frequency-doubled light (SHG) or other types of detection light beam 16 can be generated.

The detection light beam 16 travels at least partially in exactly the opposite direction to the illumination light beam 10 back along the optical path of the microscope. Here, the detection light beam 16 is deflected backwards at the scanning unit 12 so that a fixed detection light beam 16 is formed once again between the scanning unit 12 and the detector 21 at any point and in any deflection direction of the scanning unit 12. The detection light beam 16 is imaged on an aperture 18 by an optical system 17.

The aperture 18 is arranged confocally, that is, optically congruent with the focus of the illumination light beam 10 in the sample. In this way, light which originates from the focus of the illumination light beam 10 in the sample 15 can pass through the confocal aperture 18, whereas light originating from loci outside the focus is suppressed. This confocal detection enables scattered light suppression and three-dimensional scanning of the sample 15 for three-dimensional imaging.

The detection light beam 16$b$ passing through the aperture 18 is optically diffracted and diverged at the aperture 18. A lens 19 parallelizes the detection light beam 16$b$ and conducts it to a detector 21. The detection area 22 of the detector 21 is an array 4 of SPADs 3 according to FIG. 2. The detection light beam 16$b$ can be imaged on the array 4 by means of further lenses 20.

Provided that the aperture 18 is round, the detection light beam 16$b$ has a distribution on the detection area 22 that corresponds to an Airy distribution. In the case that the aperture 18 is angular, slit-shaped or of another shape, other diffraction patterns are correspondingly imaged on the detection area 22. Typically, a Gaussian distribution describes the diffraction pattern of the detection light beam 16$b$ on the detection area 22 in a sufficiently precise manner. For the present invention, the exact shape of the diffraction pattern is not important, but only its property that a sufficiently homogeneous illumination of the detection area 22 of the array 4 is not provided without further measures.

In the microscope shown in FIG. 4, the detection light beam 16$b$ is imaged on the array 4, for example, with a Gaussian profile and relatively rapidly leads to saturation of the detector 21, as already described in the general part of the description.

Figure 5:
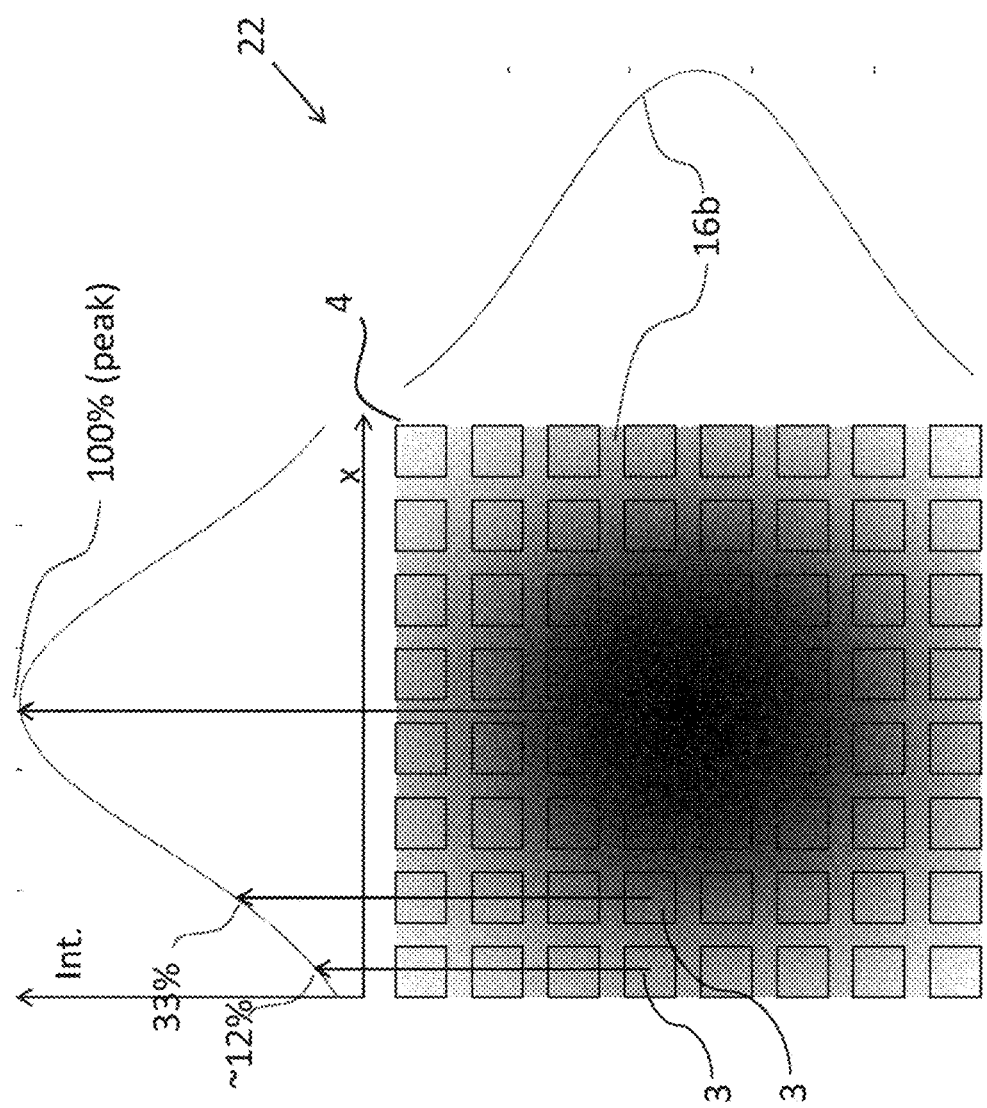
FIG. 5 is a schematic view of the profile of the light incident on the detection area of the laser scanning microscope shown in FIG. 4.

FIG. 5 is a schematic view of the detection light beam incident on the detection area 22 of the laser scanning microscope shown in FIG. 4. The detection area 22 is formed by the array 4. Here, for example, the SPADs 3 of the array 4 arranged in the edge region are illuminated with less than 10% of the central intensity. The closest, further inwardly arranged SPADs 3 are also illuminated with only approximately 33% of the central intensity. Therefore, the inner SPADs 3 will show a saturation effect significantly earlier in the manner of the characteristic curve 7 shown in FIG. 3 than outer SPADs 3.

Figure 6:
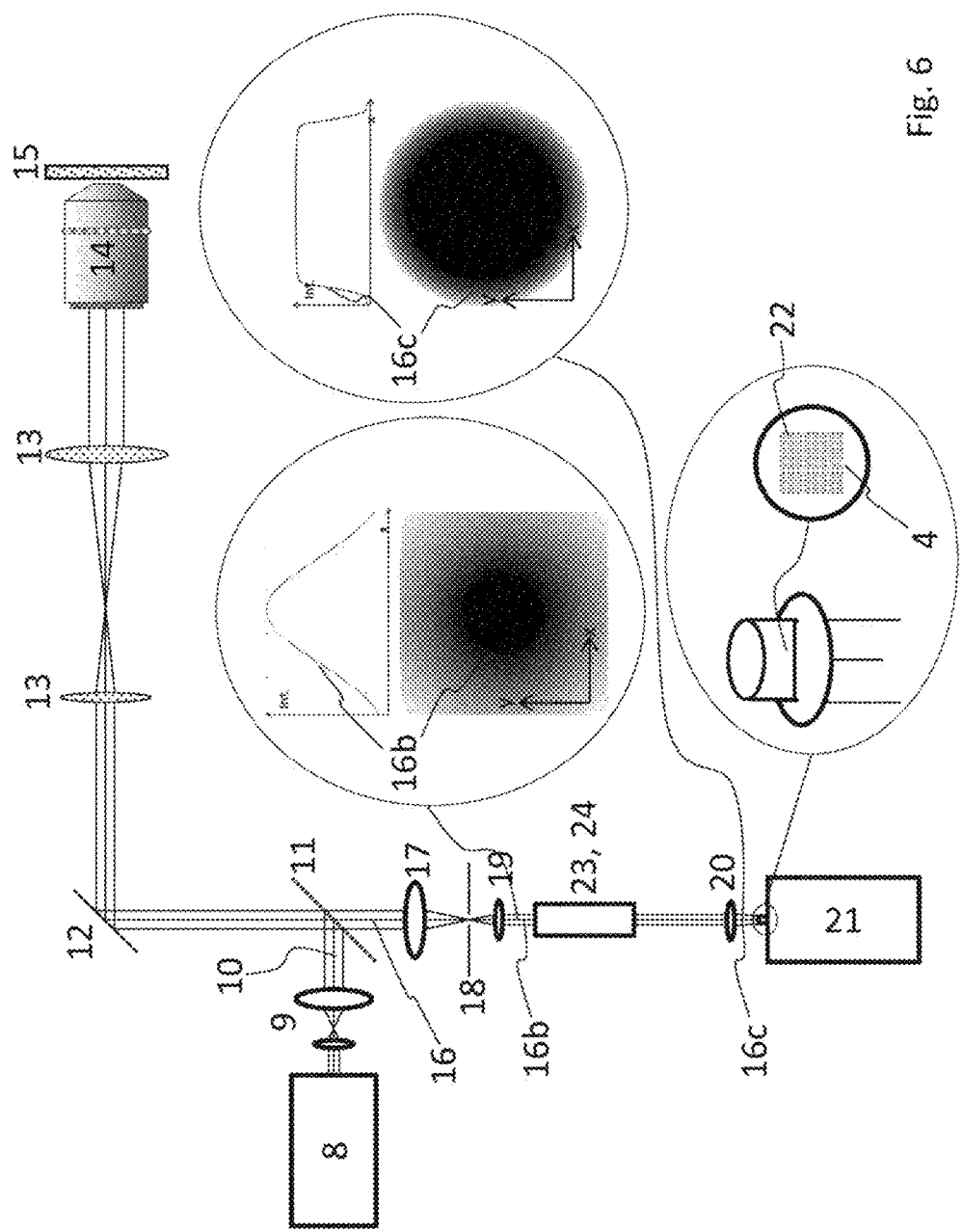
FIG. 6 is a schematic view of the laser scanning microscope of FIG. 4 comprising a device for detecting light according to a first embodiment of the invention.

FIG. 6 is a schematic view of the laser scanning microscope of FIG. 4 comprising a device for detecting light according to a first embodiment of the invention. The laser scanning microscope shown in FIG. 6 has an optical system 23 according to an embodiment of the invention between the confocal aperture 18 and the detector 21. In the embodiment shown here, said optical system is a flat-top optical system 24, as is used for applications in laser material processing. The detection light beam 16b is shaped by means of the flat-top optical system 24 such that the detection area 22 is covered as completely as possible with a light beam region of almost constant intensity. The correspondingly shaped detection light beam 16c is shown in an enlarged view in FIG. 6.

Figure 7:
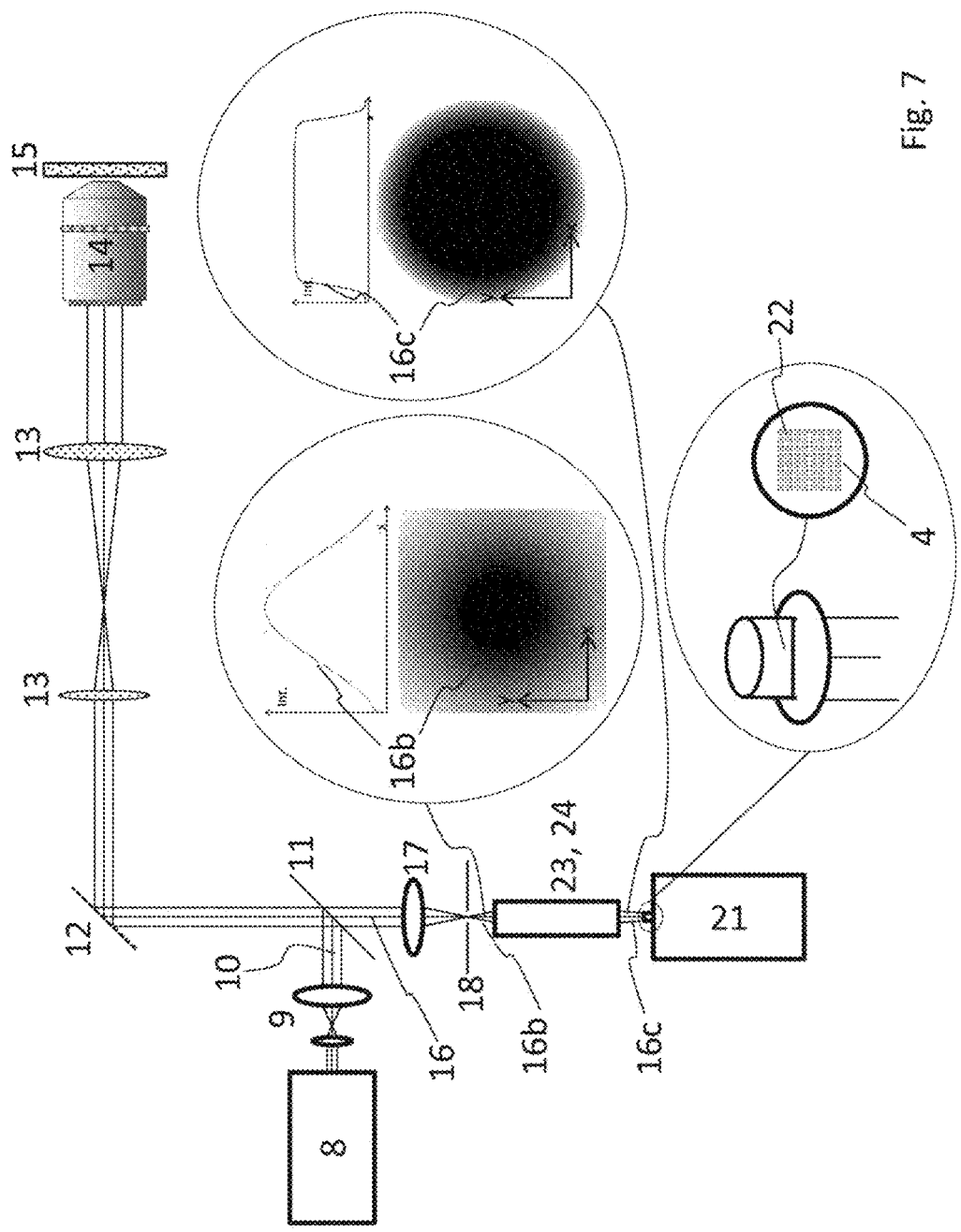
FIG. 7 is a schematic view of the laser scanning microscope of FIG. 4 comprising a device for detecting light according to a second embodiment of the invention.

FIG. 7 is a schematic view of the laser scanning microscope of FIG. 4 comprising a device for detecting light according to a second embodiment of the invention. In this embodiment, the optical system 23 is also formed as a flat-top optical system 24 and is also designed to assume the function of the lens 19 and/or lenses 20 shown in FIG. 4. Other optical paths differing in their detail or extended with further functions are also possible. For example, when using a plurality of arrangements according to the invention consisting of optical systems 23 and detectors 21, elements for the spectral distribution of the detection light beam 16 into a plurality of partial ray paths can be present. What is important according to an embodiment is only the transformation before the detectors 21 so that the detection areas 22 of the detectors 21 are covered as fully as possible with a light beam region of almost constant intensity.

Figure 8:
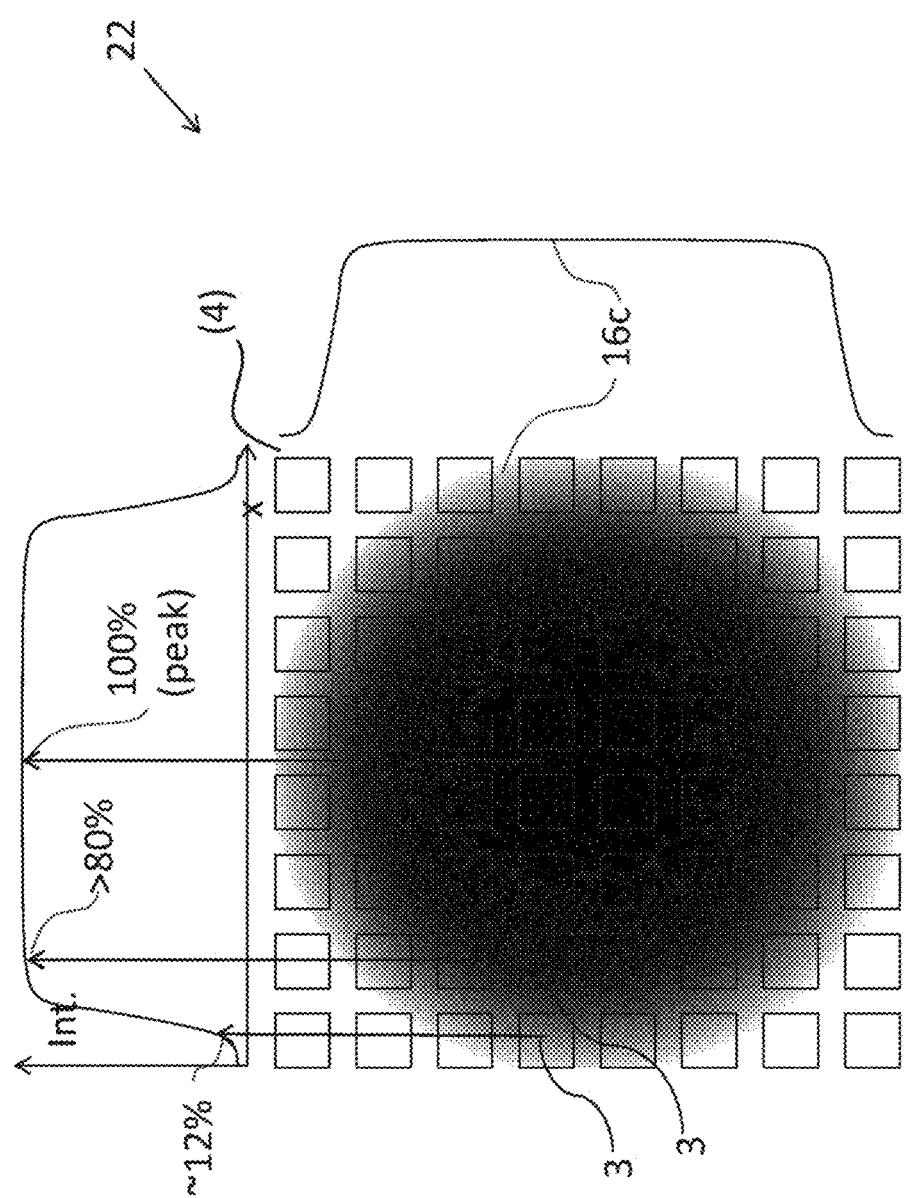
FIG. 8 is a schematic view of the profile of the light incident on the detection area of the laser scanning microscope in FIGS. 6 and 7.

FIG. 8 is a schematic view of the profile of the light 16c incident on the detection area 22 of a laser scanning microscope from FIGS. 6 and 7. It is clearly apparent here that the detection area 22 or the array 4 is dimensioned such that the detection light beam 16c which has an almost constant intensity covers the detection area 22 or the array 4 as completely as possible.

Figure 9:
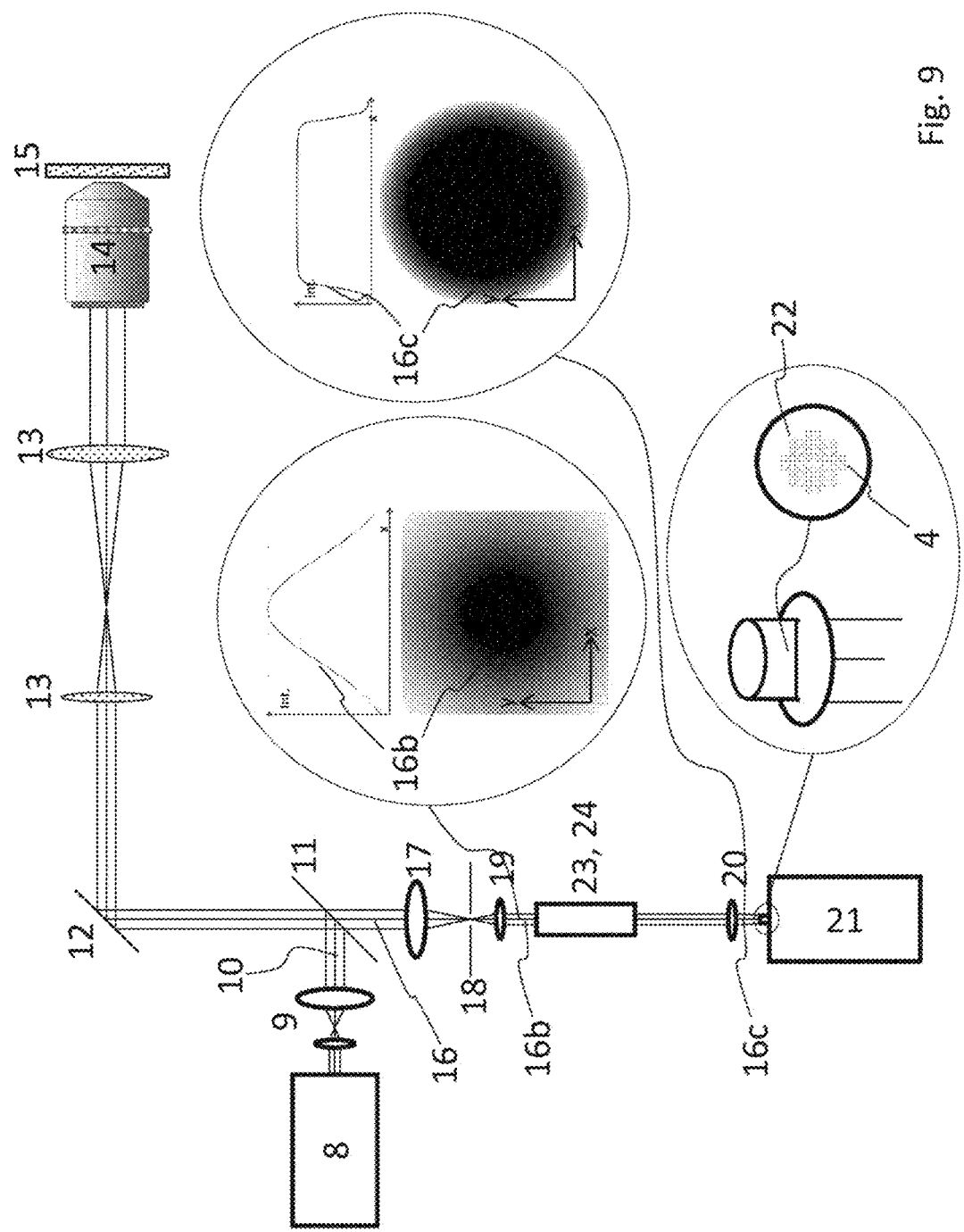
FIG. 9 is a schematic view of the laser scanning microscope of FIG. 4 comprising a device for detecting light according to a third embodiment of the invention.

FIG. 9 is a schematic view of the laser scanning microscope of FIG. 4 comprising a device for detecting light according to a third embodiment of the invention. In contrast to the embodiments of FIGS. 6 and 7, the SPADs 3 in FIG. 9 are arranged such that the detection area 22 has an at least approximate round shape. In contrast to the detection area 22 of FIGS. 6 and 7, no unexposed SPADs 3 are present or only slightly exposed SPADs which contribute to the noise of the detector 21 are now present. Rather, the detection area 22 is optimally adapted to the beam profile 16c.

Figure 10:
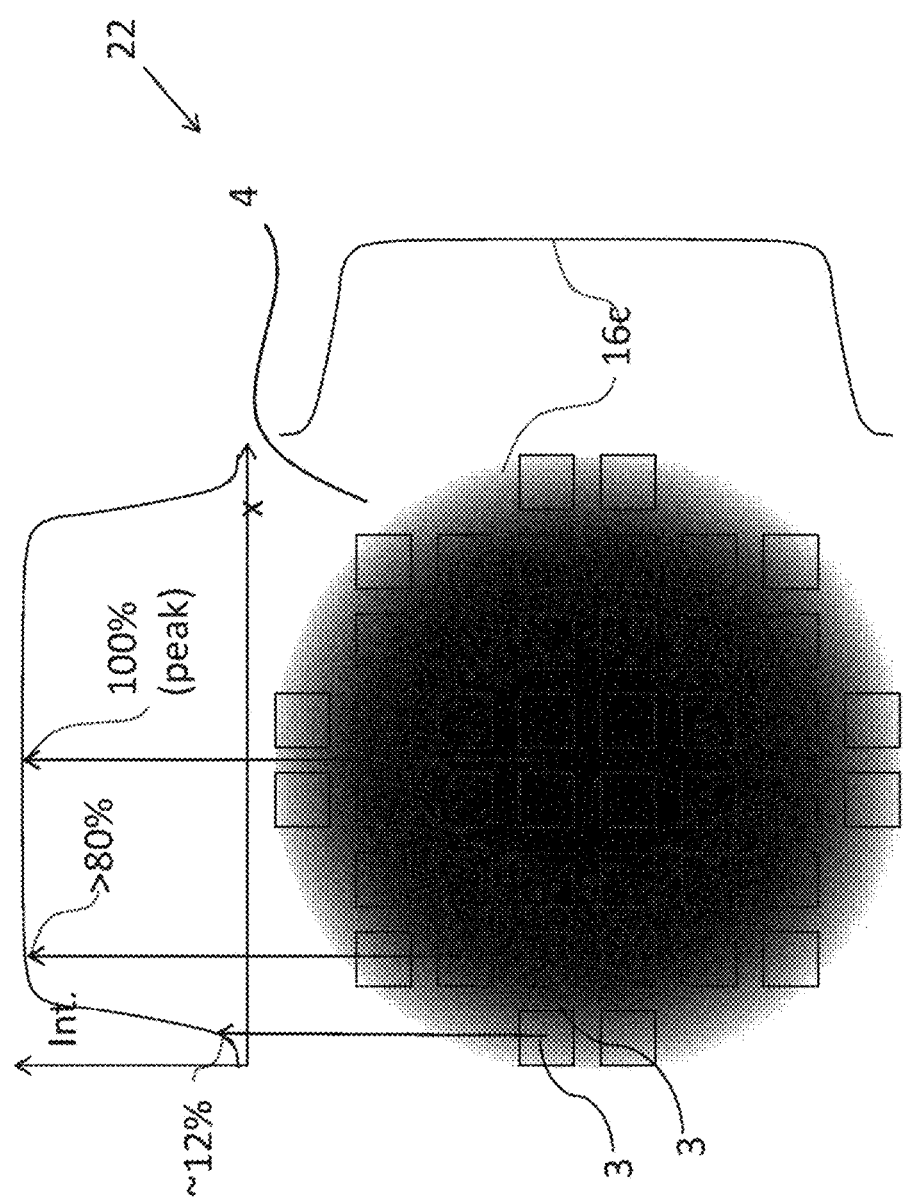
FIG. 10 is a schematic view of the profile of the light incident on the detection area of the laser scanning microscope in FIG. 9.

FIG. 10 is a schematic view of the profile of the light 16c incident on the detection area 22 of a laser scanning microscope from FIG. 9. For the avoidance of repetition, reference is made at this point to the comments relating to FIG. 9.

Figure 11:
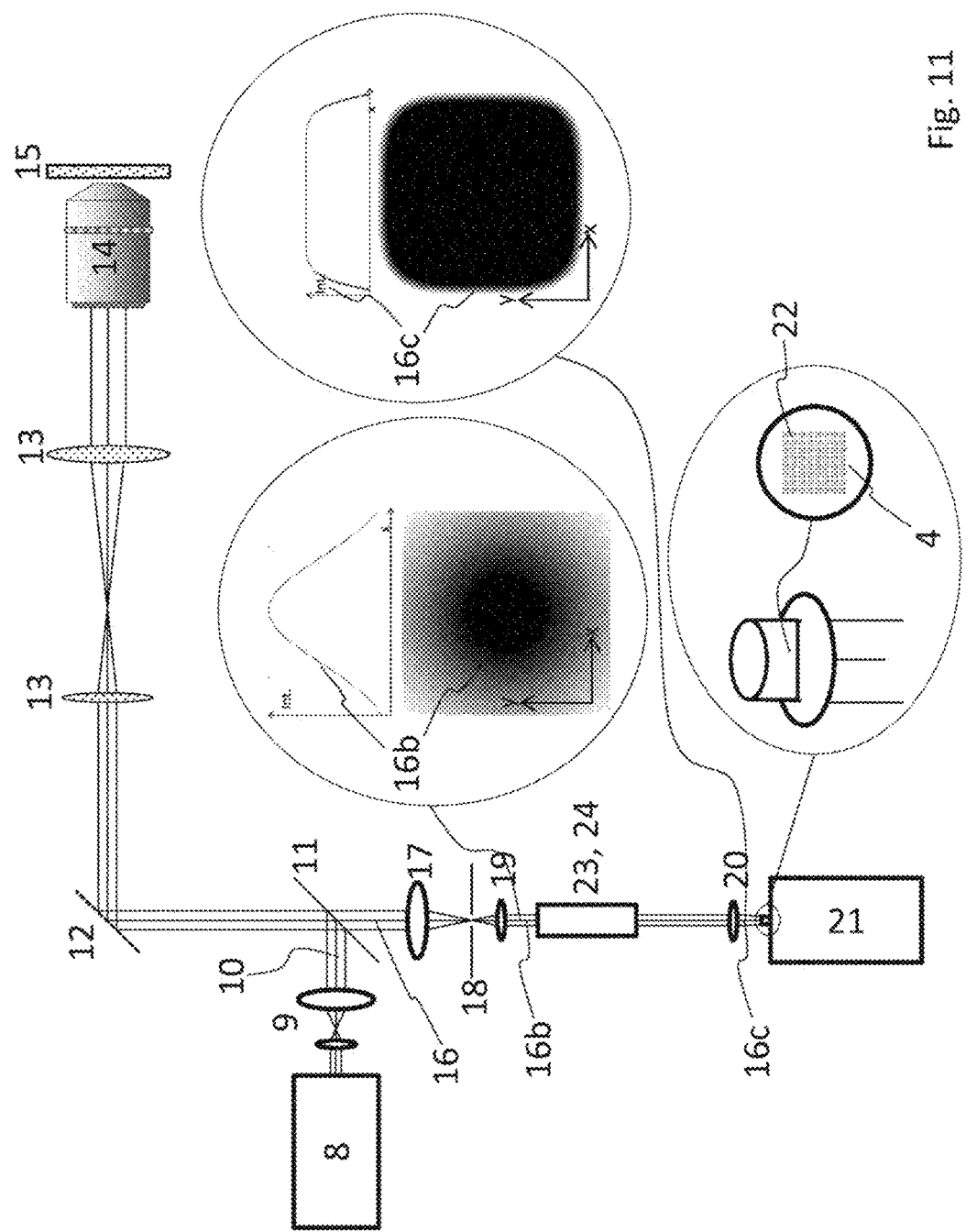
FIG. 11 is a schematic view of the laser scanning microscope of FIG. 4 comprising a device for detecting light according to a fourth embodiment of the invention.

FIG. 11 is a schematic view of the laser scanning microscope of FIG. 4 comprising a device for detecting light according to a fourth embodiment of the invention. In this case, the detection area 22 of the detector 21 is square and thus corresponds to most commercially available arrays 4. In order to achieve the best possible adaptation of the profile of the detection light beam 16c, the optical system 23 designed as a flat-top optical system 24 is configured to generate an almost square profile. A corresponding flat-top optical system 24 is manufactured, for example, by TOPAG Lasertechnik GmbH (Darmstadt) and is described by Stefan Rung et al. in Proceedings SPIE Photonics West 2014, LASE, LAMON XIX, "Laser Thin Film Ablation with Multiple Beams and Tailored Beam Profiles", paper 8967-24.

Figure 12:
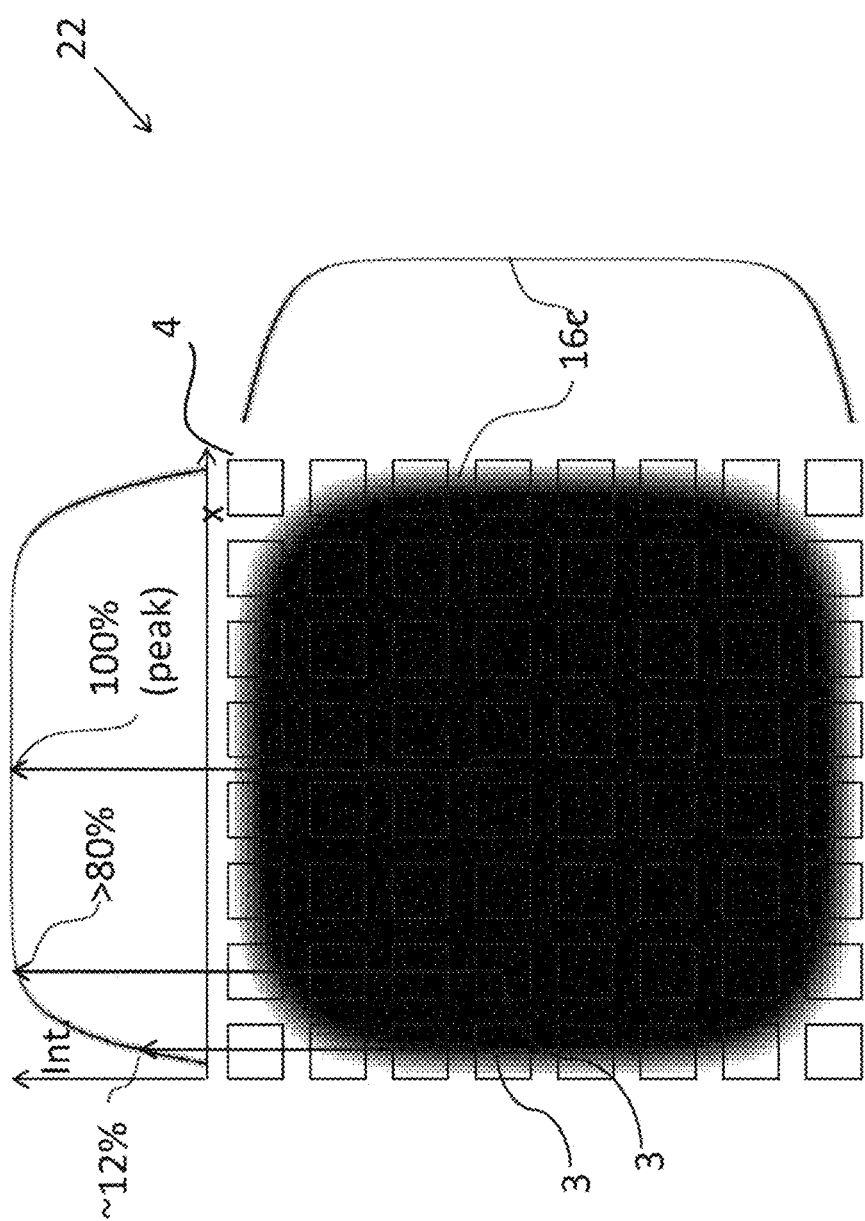
FIG. 12 is a schematic view of the profile of the light incident on the detection area of the laser scanning microscope in FIG. 11.

FIG. 12 is again an enlarged view of the profile of the light 16c incident on the detection area 22 of a laser scanning microscope of FIG. 10.

Figure 13:
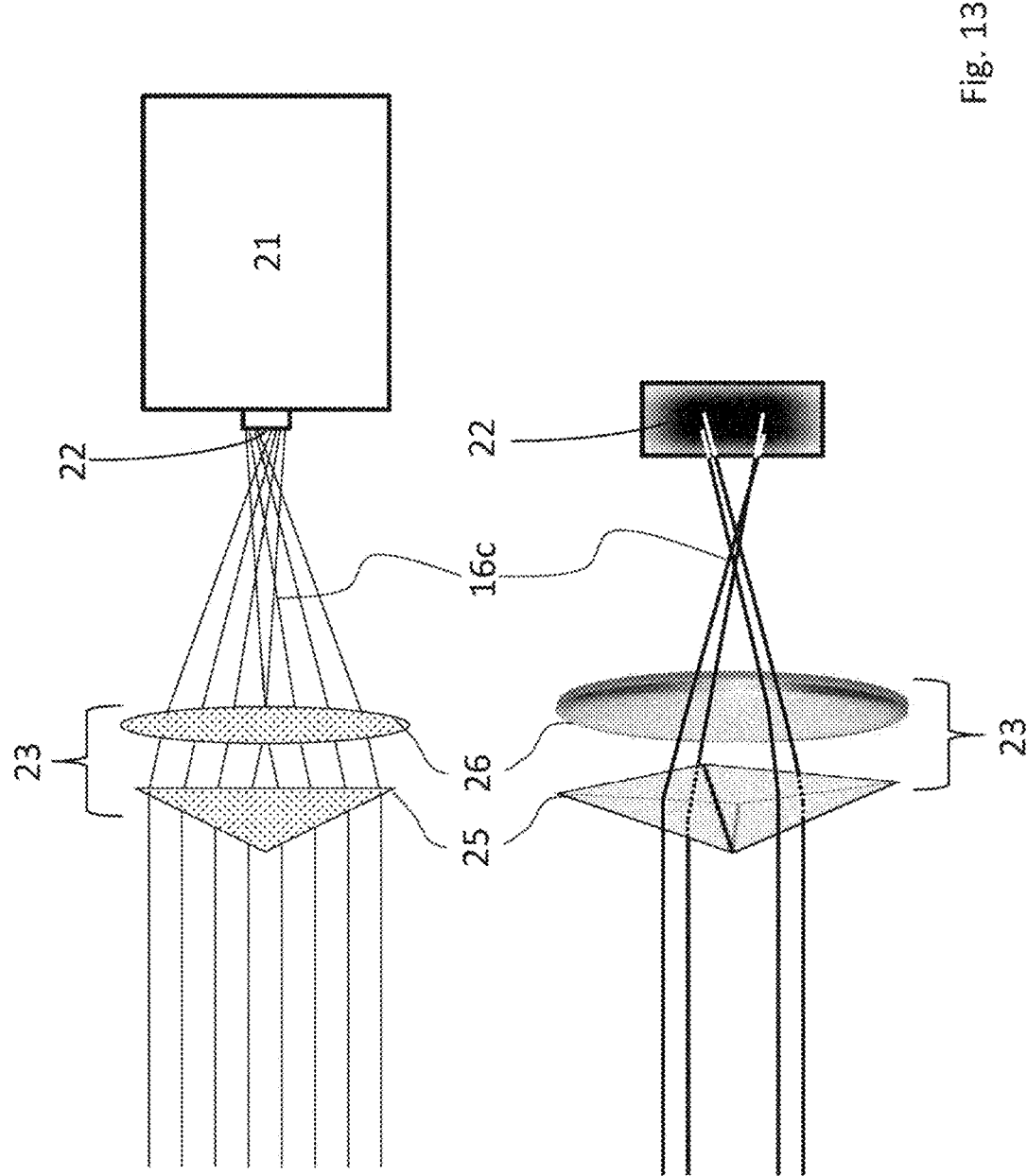
FIG. 13 is a schematic view of a fifth embodiment of a device according to the invention for detecting light.
Figure 14:
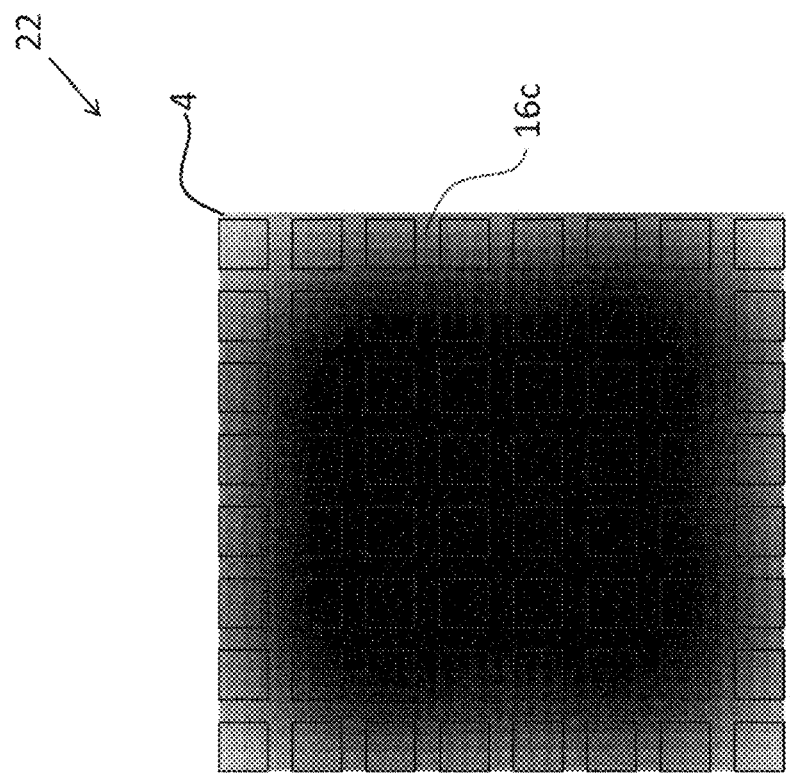
FIG. 14 is a schematic view of the profile of the light incident on the detection area of the device in FIG. 13.

FIG. 13 is a schematic view of a fifth embodiment of a device according to the invention for detecting light. It is apparent from FIG. 13 that the optical system 23 is constructed from a pyramidal component 25 and a focusing lens 26. With this arrangement, four Gaussian profiles of the detection light beam 16c are formed in the manner of a four-lobe cloverleaf on the detection area 22 of the detector 21. Through suitably selecting the dimensions of the pyramidal component 25, of the focusing lens 26 and of the detection area 22, a square detection area 22 can be homogeneously illuminated, right up into the corners. A correspondingly generated light distribution on a detection area 22 is shown, by way of example, in FIG. 14.

In this case, the order of the pyramidal component 25 and the focusing lens 26 can be swapped. Furthermore, a polyhedral component adapted to the shape of the detection area 22 and the optical ray path can be used instead of the pyramidal component 25. It is essential only that from a plurality of small Gaussian profiles, an overall profile is generated which covers the detection area 22 as homogeneously as possible.

Figure 15:
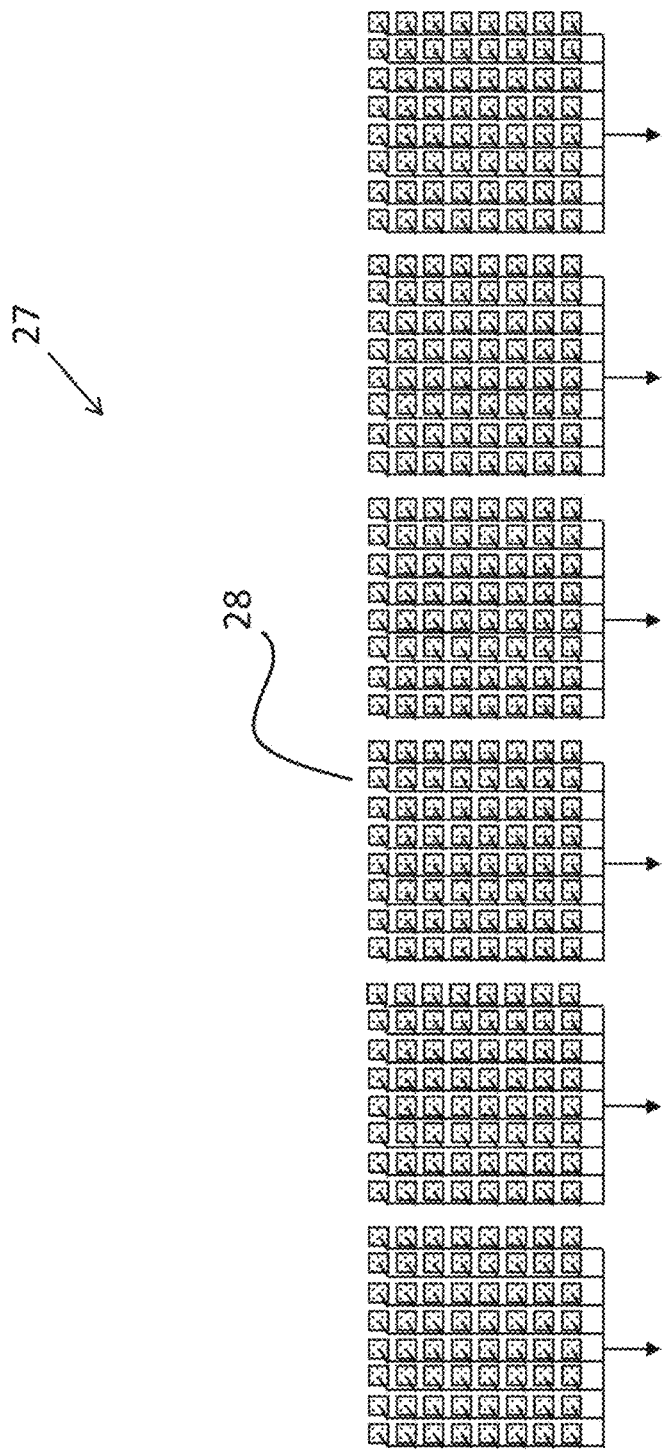
FIG. 15 is a schematic view of an embodiment of a line detector.

FIG. 15 is a schematic view of an embodiment of a line detector 27. In the line detector 27 shown in FIG. 15, a plurality of arrays 4, which all themselves already consist of a plurality of parallel SPADs 3, are assembled to form a detector line 28 which has a plurality of signal outputs. Thus, the detection light beam 16c can be picked up in a spatially resolved manner. Suitable line detectors 27 are used, for example, for detection of spectrally split light in a spectrometer.

Figure 16:
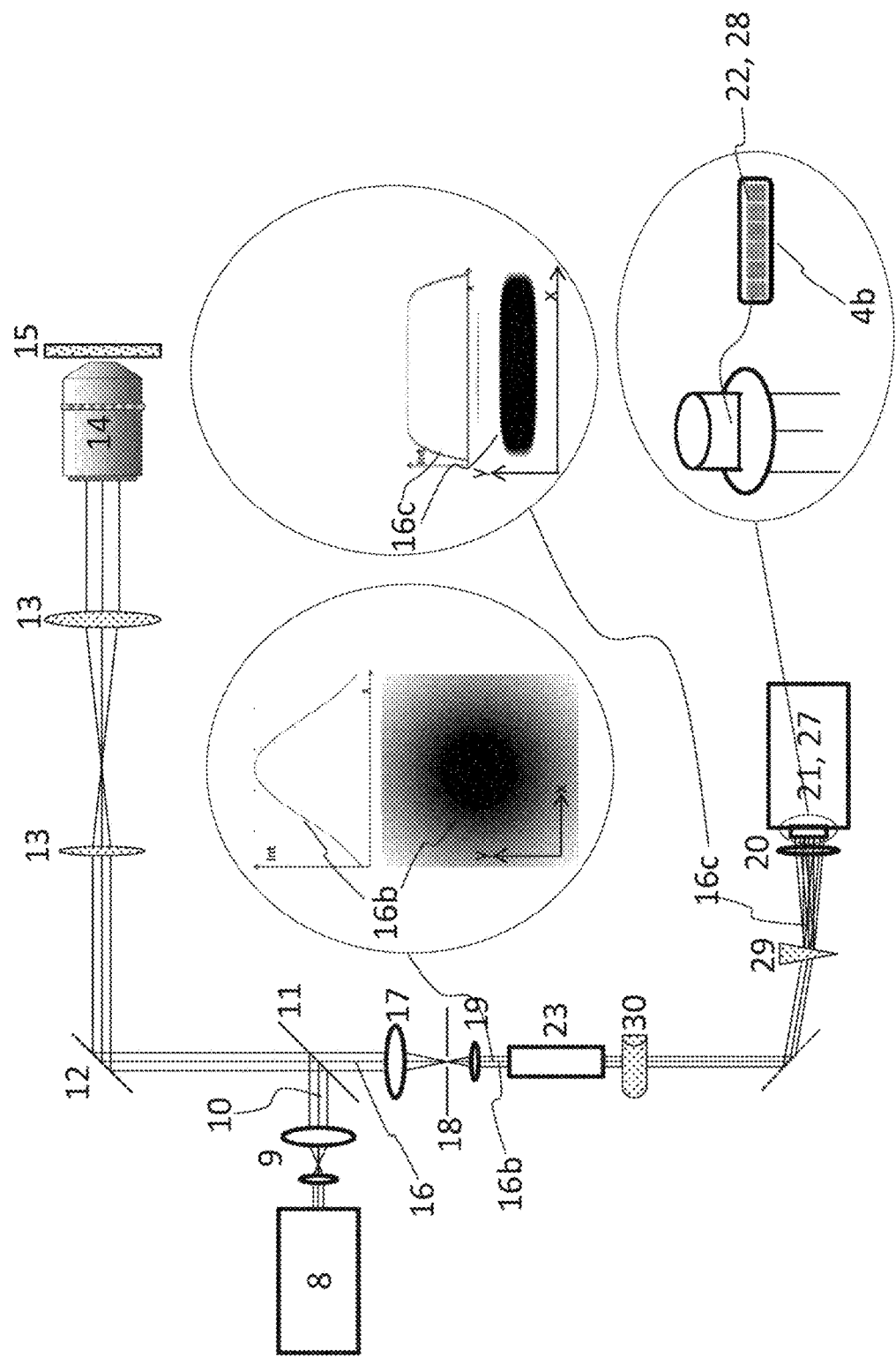
FIG. 16 is a schematic view of the laser scanning microscope of FIG. 4 comprising a device for detecting light according to a sixth embodiment of the invention.
Figure 17:
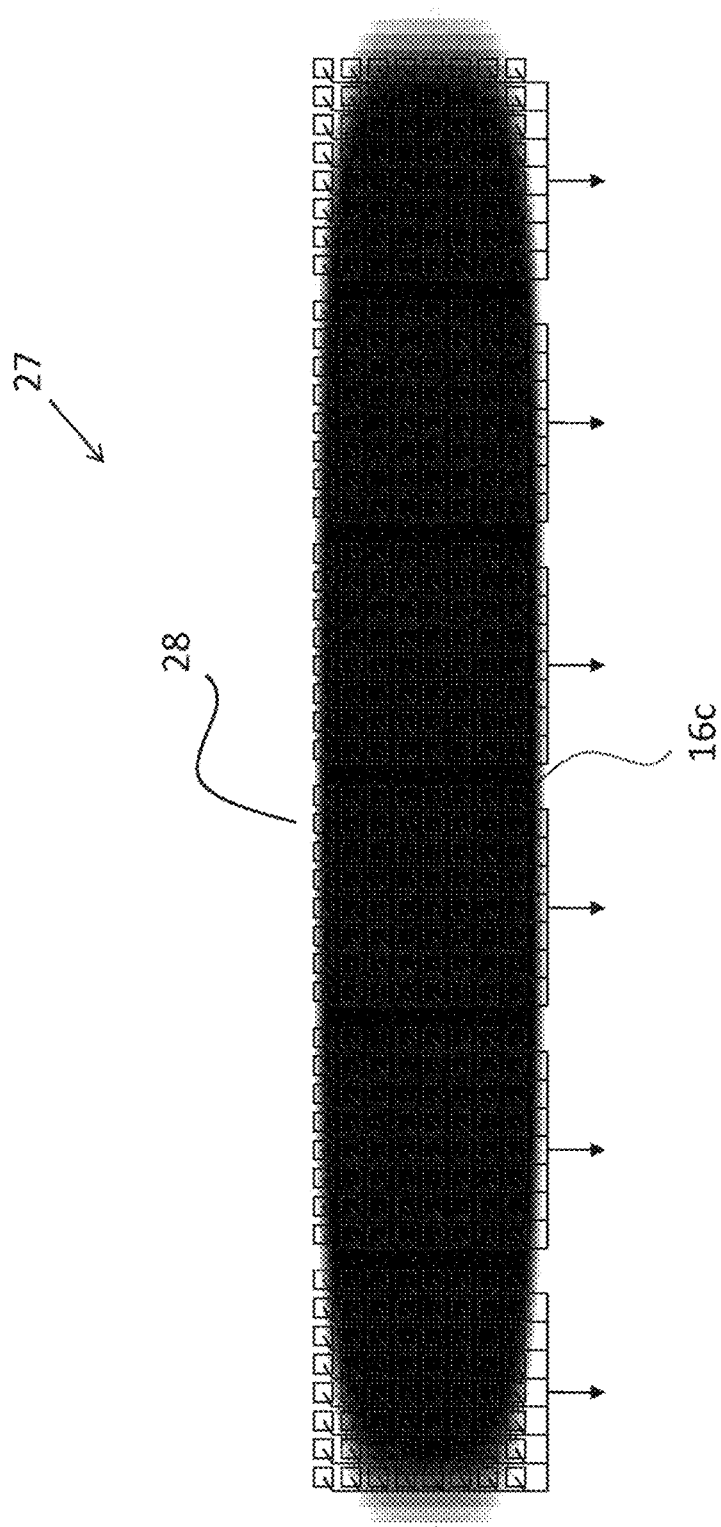
FIG. 17 is a schematic view of the profile of the light incident on the detection area of the laser scanning microscope in FIG. 16.

FIG. 16 is a schematic view of the laser scanning microscope of FIG. 4 comprising a device for detecting light according to a sixth embodiment of the invention. The detector 21 is formed as a line detector 27 according to FIG. 15 in this case. Furthermore, in addition to the optical system 22, a dispersive element 29 (e.g. a prism or a grating) and a cylindrical lens 30 are arranged in front of the detector 21. The cylindrical lens 30 or the dispersive element 29 or a combination of both can, in conjunction with an optical system 23, deform the detection light beam 16c such that a homogenized illumination of the detector line 28 of the line detector 27 is formed. A correspondingly illuminated detector line 28 of a line detector 27 is shown in an enlarged view in FIG. 17. The homogenized illumination with the detection light beam 16c then represents a flat line profile, which has relatively sharp edges and a homogeneous intensity distribution in the inner region of the line profile.

With regard to further advantageous embodiments of the device according to the invention, for the avoidance of repetition, reference is made to the general part of the description and to the attached claims.

Reference is expressly made to the fact that the above-described embodiments of the device according to the invention serve merely to explain the claimed teaching, but do not restrict said teaching to the embodiments.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A device for detecting a detection light beam imaged onto a confocal aperture, the device comprising:
    at least one silicon photomultiplier (SiPM) comprising a detection area formed from an array of a plurality of single-photon avalanche diodes (SPADs); and
    at least one flat-top optical system disposed between the SiPM and the confocal aperture and configured to shape the detection light beam such that the detection area is substantially covered with a light beam region of substantially constant intensity.

2. The device as claimed in claim 1, wherein the flat-top optical system is a diffractive optical system, a refractive optical system or a reflective optical system.

3. The device as claimed in claim 2, wherein the flat-top optical system comprises a first lens and a second lens, wherein the first lens and/or the second lens are aspherical lenses or free-form lenses and wherein the first lens distorts a radial profile of the light and the second lens collimates the light.

4. The device as claimed in claim 2, wherein at least one lens or microlens of the flat-top optical system comprises an antireflection layer on a lens surface.

5. The device as claimed in claim 1, wherein the flat-top optical system contains a microlens array.

6. The device as claimed in claim 1, wherein the optical system contains a pyramidal or polyhedral component formed by a glass or polymer block, and a focusing lens.

7. The device as claimed in claim 1, wherein the optical system is configured to shape the detection light beam such that the region of substantially constant intensity has a substantially round or rectangular shape.

8. The device as claimed in claim 1, wherein the SPADs are configured and/or arranged such that the detection area has a round or at least approximately round shape.

9. The device as claimed in claim 1, wherein the SPADs are configured and/or arranged such that the detection area has a rectangular shape.

10. The device as claimed in claim 1, wherein the silicon photomultiplier (SiPM) is configured as a line detector, the line detector comprising at least two individual arrays having a plurality of SPADs each having at least two signal outputs.

11. The device as claimed in claim 10, further comprising a dispersive element arranged between the optical system and the line detector.

12. A microscope comprising the device for detecting light as claimed in claim 1.

13. The microscope as claimed in claim 12, wherein the microscope is useable in fluorescence microscopy, SHG microscopy and/or Raman microscopy.

14. A method for detecting a detection light beam imaged onto a confocal aperture, the method comprising:
    detecting light in a microscope using at least one silicon photomultiplier (SiPM) comprising a detection area formed from an array of a plurality of single-photon avalanche diodes (SPADs), and at least one flat-top optical system disposed between the SiPM and the confocal aperture and configured to shape the detection light beam such that the detection area is substantially covered with a light beam region of substantially constant intensity.

* * * * *